United States Patent
Goislot

(10) Patent No.: US 8,596,039 B2
(45) Date of Patent: *Dec. 3, 2013

(54) DEVICE FOR INJECTING A MONO-PROPELLANT WITH A LARGE AMOUNT OF FLOW RATE MODULATION

(75) Inventor: Hervé Goislot, Paris (FR)

(73) Assignee: Snecma, Paris (FR)

(*) Notice: Subject to any disclaimer, the term of this patent is extended or adjusted under 35 U.S.C. 154(b) by 1091 days.

This patent is subject to a terminal disclaimer.

(21) Appl. No.: 12/500,052

(22) Filed: Jul. 9, 2009

(65) Prior Publication Data

US 2010/0005779 A1 Jan. 14, 2010

(30) Foreign Application Priority Data

Jul. 11, 2008 (FR) ...................................... 08 54777

(51) Int. Cl.
*F02K 9/00* (2006.01)

(52) U.S. Cl.
USPC .................. 60/258; 60/257; 60/240; 60/243; 60/740; 60/39.461; 60/39.462

(58) Field of Classification Search
USPC .............. 60/257, 258, 240, 243, 740, 39.461, 60/39.462
See application file for complete search history.

(56) References Cited

U.S. PATENT DOCUMENTS

| 3,074,231 A | 1/1963 | Klein |
| 3,431,733 A | 3/1969 | Hamrick |
| 3,464,633 A | 9/1969 | Potocnik |
| 3,742,701 A * | 7/1973 | Feemster et al. ................ 60/258 |
| 3,897,008 A * | 7/1975 | Dettling et al. ................ 239/410 |
| 4,000,613 A | 1/1977 | Fukumoto et al. |
| 8,141,338 B2 * | 3/2012 | Goislot ........................... 60/258 |

* cited by examiner

*Primary Examiner* — Gerald L Sung
*Assistant Examiner* — Craig Kim
(74) *Attorney, Agent, or Firm* — Preti Flaherty Beliveau & Pachios LLP

(57) ABSTRACT

The device for injecting a liquid mono-propellant with a large amount of modulation of its flow rate and disposed at an upstream end of the wall of a combustion chamber of a rocket engine has a feed channel for feeding a mono-propellant from a tank. The device includes a single annular speed-up channel connected to the feed channel and having its outlet opening out via an annular injection section, the speed-up channel and the annular injection section being defined firstly by a first wall forming a stationary surface of revolution situated level with said upstream end, and secondly by a second wall forming a surface of revolution that is on a part that is movable in translation relative to the first wall forming a stationary surface of revolution.

14 Claims, 4 Drawing Sheets

DEVICE FOR INJECTING A MONO-PROPELLANT WITH A LARGE AMOUNT OF FLOW RATE MODULATION

FIELD OF THE INVENTION

The present invention relates to a device for injecting a liquid mono-propellant with a large amount of flow rate modulation and with it being possible to shut the injection plane for extinction and re-ignition purposes, the device being located at an upstream end of the wall of a combustion chamber of a rocket engine and including a feed channel for feeding a mono-propellant from a tank.

PRIOR ART

Various liquid propellant injector devices for rocket engines are already known.

By way of example, FIG. 5 shows a "pintle" type device that makes it possible, for bi-propellant injection, to modulate the flow rate to a large extent as a result of the injection sections being varied by a movable part 34.

In the system of FIG. 5, an oxidizer is injected into the combustion chamber 30 through an annular orifice 32 between a movable part 34 and a stationary part 36 coaxially located therein. A fuel is also injected through an annular orifice 38 around the movable part 34, between the movable part and a portion of the wall of the combustion chamber 30. The fuel and the oxidizer diverge away from their respective outlet orifices and form jets that meet and mix in an annular combustion zone designated by reference 40.

Nevertheless, implementing two independent feed systems for a fuel and for an oxidizer makes fabrication rather complex and the device cannot be compact, in particular when it incorporates a shutter rod.

In general, a bi-propellant design with two sheets that are to mix together in part by friction on meeting each other in a zone of a combustion chamber does not enable optimum atomization to be achieved, in particular during an ignition stage.

U.S. Pat. No. 3,742,701 describes an injector device for injecting a liquid bi-propellant that is to react with a solid propellant. The movable part of that injector device flares downstream and is very sensitive to the pressure that exists in the combustion chamber with which the injector device is associated.

DEFINITION AND OBJECT OF THE INVENTION

The present invention seeks to remedy the above-mentioned drawbacks and to enable a compact injector device to be provided that is adapted to mono-propellant injection, presenting a design that is simplified and that enables the injection flow rate to be modulated while providing improved atomization, together with closure in a single zone (in the injection plane).

These objects are achieved, in accordance with the invention, by a device for injecting a liquid mono-propellant with a large amount of flow rate modulation, the device being disposed at the upstream end of a wall of a combustion chamber of a rocket engine and including a channel for feeding it with a mono-propellant from a tank, wherein the device has a single annular speed-up channel connected to the feed channel and having its outlet opening out via an annular injection section, the speed-up channel and the annular injection section being defined firstly by a first wall forming a stationary surface of revolution situated level with said upstream end, and secondly by a second wall forming a surface of revolution on a part that is movable in translation relative to said first wall forming a stationary surface of revolution and presenting beside the combustion chamber a free end that constitutes a fine point.

Preferably, the device has a third wall forming a stationary surface of revolution situated facing the annular injection section to receive a jet of the liquid mono-propellant projected through the annular injection section.

In a first possible embodiment, the third wall constituting a stationary surface of revolution is formed on a central endpiece connected to the upstream end of the wall of the combustion chamber.

In a second possible embodiment, the third wall constituting a stationary surface of revolution is formed on a peripheral ring connected to the upstream end of the wall of the combustion chamber.

According to an advantageous characteristic of the invention, the movable part has a pilot section that is subjected to the effects of the fluid flow rate in the feed channel and that acts against the action of a resilient element dimensioned to enable the movable part to move into an open position when a predetermined force is exerted on the pilot section.

Nevertheless, in another possible embodiment, the movable part is coupled to an actuator to be moved under force control.

The technology of the invention is based on associating a system for modulating the flow rate of a mono-propellant with the propellant being atomized in a free sheet or by impacting against a stationary wall, possibly also in association with a shutter.

When a resilient element is used, it may be constituted by a calibrated spring or by a set of spring washers.

In a first embodiment, the first wall constituting a stationary surface of revolution and the second wall constituting a surface of revolution on the movable part are frustoconical with their small bases facing towards the third wall constituting a stationary surface of revolution.

In a second embodiment, the first wall constituting a stationary surface of revolution and the second wall forming a surface of revolution on the movable part are frustoconical with their large bases facing towards the third wall constituting a stationary surface of revolution.

Advantageously, the third wall constituting a stationary surface of revolution is frustoconical.

According to a particular characteristic of the present invention, the mono-propellant feed holes are defined by a bell-shaped body having: a bearing flange fastened by bolts to the upstream end of the combustion chamber wall; a guide surface for the movable part; and also a sealing surface against which a gasket slides.

The design of the body for fabrication in a single concentricity-imparting stage makes it possible to ensure that the sheet is regular around its entire periphery and that closure is practically perfect;

In a second embodiment, the device may include a central part secured to said central column that defines the first wall constituting a stationary surface of revolution and that further includes a front wall with a portion situated facing the third wall constituting a stationary surface of revolution, which portion forms a reflector for the jet of liquid mono-propellant projected against the third wall constituting a stationary surface of revolution.

In an advantageous aspect of the present invention, the resilient element is constituted by a spring against which a bearing ring bears, having a position that is adjusted by screws for adjusting in translation the tension of the spring that determines the opening condition for the injector.

In another advantageous aspect of the present invention, it further comprises a sensor for sensing movement in translation of the movable part that serves to determine by simple geometrical calculation the flow section through the speed-up channel.

In general, for a mono-propellant, the invention enables the injection flow rate to be modulated using a small flow rate on ignition and subsequently a large amount of variation by having an injection section that is variable while enabling the speed of injection to be relatively stable.

Injection may be closed off completely in the injection plane when the mono-propellant flow rate is zero, thereby avoiding any combustion in the cavities of the injector, any combustion residues, or indeed any explosions, given the nature of certain propellants.

The system is mechanically simple and very compact, having only a single propellant feed channel.

Atomization takes place by the propellant being projected against a stationary wall, thereby providing atomization that is better than that provided by an impact between two sheets.

Furthermore, the injector device is easily adaptable and the central endpiece used as a projection or reflection surface may be easily interchangeable in order to adapt the shape or the angle of the stationary surface that receives the impact of a propellant jet. Under certain conditions of injection and fluid state, the endpiece may be omitted so as to operate with atomization in a free sheet.

The device of the invention is applicable to any rocket engine presenting a high degree of thrust modulation (using liquid or hybrid propellant), and the invention also relates to a rocket engine fitted with the liquid mono-propellant injector device.

BRIEF DESCRIPTION OF THE DRAWINGS

Other characteristics and advantages of the present invention can be better understood on reading the following description of particular embodiments, given by way of non-limiting indication, and with reference to the drawings, in which.

DETAILED DESCRIPTION OF PREFERRED EMBODIMENTS

Figure 1:
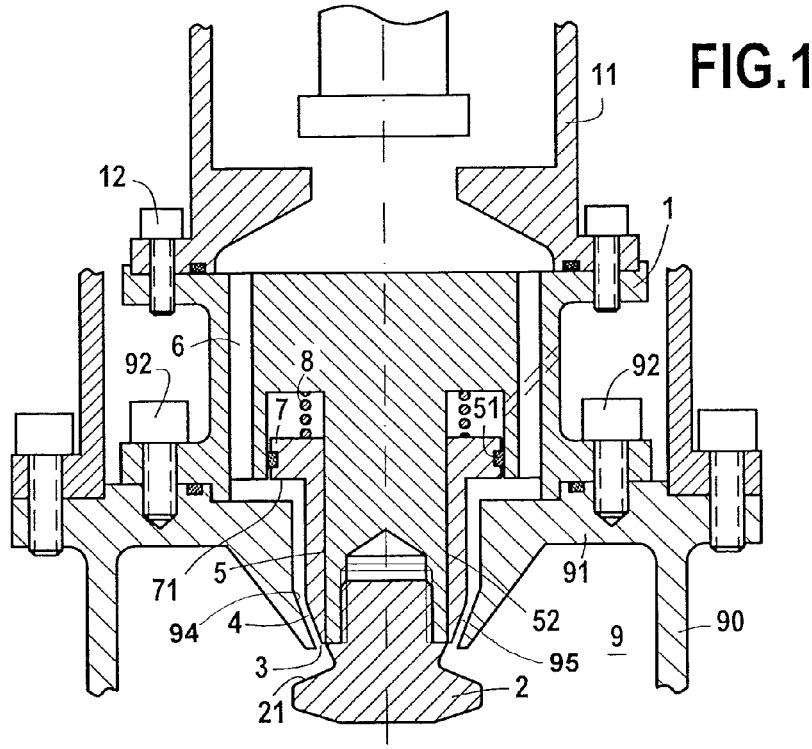
FIG. 1 is a diagrammatic axial section view of a mono-propellant injector device in a first embodiment of the invention, having a central endpiece.

With reference to FIG. 1, there can be seen a diagrammatic longitudinal section view of a first element of a mono-propellant injector device of the invention.

FIG. 1 shows a portion of a combustion chamber 9 defined by a wall 90 having a front end identified by reference 91.

A bell-shaped body 1 has a flange-shaped base that is fastened on the end wall 91 by fastener elements 92 such as bolts. The body 1 defines liquid propellant feed holes 6 that are side by side around the ring and in communication with a tank through a space defined by a second body 11 fastened to the bell-shaped body 1 by bolts or screws 12.

An endpiece 2 secured to the bell-shaped body 1 is disposed in the combustion chamber 9 and presents a stationary surface of revolution 21, e.g. a frustoconical surface, that is situated facing and at a short distance away from a propellant injection section 3 that is in communication via an annular speed-up segment 4 with the injection feed holes 6.

A movable part 5 forms a body of revolution arranged coaxially with the body 1 and guided relative thereto by means of a guide surface 52 providing long guidance. The movable part 5 has a head portion 7 of greater diameter that defines a surface for receiving a gasket 51 that provides sealing relative to the body 1.

A face 71 of the head portion 7 of the movable part 5 defines a pilot section that is subjected to the variations in the flow rate of the propellant flowing through the feed holes 6, with these flow rate variations varying in substantially the same manner as pressure.

The rear face of the head portion 7 of the movable part 5 is subjected to the action of a resilient element such as a spring 8 that is interposed between the stationary body 1 and the movable part 5.

The spring 8 is dimensioned in such a manner as to urge the movable portion 5 into its position for closing the propellant injection section 3 in an outlet plane of the injector when the flow rate of the mono-propellant is zero, and to cause said propellant injection section 3 to open when the flow rate of propellant acting on the pilot section 71 produces a predetermined effect on the spring 8.

Adjacent to the endpiece 2, the movable part 5 has a terminal portion 95 that is frustoconical in shape and co-operates with a stationary wall 94 that is likewise frustoconical and is formed by a portion of the end wall 91 that projects into the chamber 9 so as to define a speed-up channel 4 that opens out into the combustion chamber 9 via the injection section 3 situated facing the frustoconical wall of the endpiece 2.

At the outlet from the injector, the liquid mono-propellant is atomized on striking the wall 21 of the endpiece 2.

The frustoconical walls 94, 95 (first and second walls) defining the speed-up channel 4 have their small bases directed towards the endpiece 2. In the example shown in FIG. 1, the frustoconical wall 21 (third wall) of the endpiece 2 has its small base closest to the injection section 3, but the stationary wall 21 could present some other configuration adapted to the nature of the propellant and/or operating conditions. The endpiece 2 defining the projection surface 21 is removable, and confers modularity, enabling the shape and the angle of inclination of the projection surface 21 to be adapted as a function of the type of impact that is desired.

The injector device of the invention adapted to a mono-propellant has a single speed-up channel 4 and serves to atomize the propellant by projecting it against a stationary wall 21, thereby contributing to define a device with improved compactness and capacity for atomizing.

The mechanical architecture is capable of guaranteeing a very high degree of precision in manufacture and of conferring excellent reliability on the injector device.

The bell-shaped body 1 with a central guide column may be machined in a single stage (see the variant embodiment of FIG. 2). Given the statically-indeterminate nature of the system, this concept makes it possible to guarantee good concentricity so as to achieve simultaneously:

- long guidance of the movable part 5 along the surface 52;
- sealing relative to the outside surface of the movable part 5 via the gasket 51; and
- centering of the body 1 via its plane engagement on the end plate 91 of the wall 90 of the combustion chamber 9, the end plate defining via its projecting portion the stationary wall 94 that co-operates with the movable wall 95 of the movable part 5 to define the speed-up channel 4. The facts of minimizing the number of parts that are stacked on one another and of machining long cylinders in a single stage serves to guarantee good operation, in particular concerning the uniformity of the injected sheet and contact between surfaces when shut.

Furthermore, beside the combustion chamber 9, the movable part 5 is terminated by a free end in the form of a fine point so as to minimize the effects of pressure in the chamber 9 on the spring 8, or on the spring washers that could be used instead of the spring 8.

FIG. 2 shows a variant embodiment of the FIG. 1 injector device adapted to circumstances in which a central rod 13A is axially movable under drive from a spring 14 and may serve, for example, to control selective shutting of the throat of the combustion chamber 9. Under such circumstances, the bell-shaped body 1 itself includes, formed integrally with the body 1, a central tubular portion that is interposed between the movable part 5 and the central rod 13A so as to provide simultaneously long guidance for the movable part 5 and short centering for the movable central rod 13 relative to the stationary body 1. The movable central rod 13A is provided with other short centering situated upstream from the throat of the combustion chamber 9.

The operation of the FIG. 2 variant is otherwise analogous to that of the FIG. 1 embodiment and the description of elements that they have in common, which elements are given the same references, is not repeated.

FIG. 2 shows a protective coating 93 on the inside face of the combustion chamber wall 90, which coating could also be applied in the other embodiments that are described.

FIGS. 3 and 4 show a second embodiment of the invention that relies on the same principles as the first embodiment of FIGS. 1 and 2, but in which the stationary wall receiving the impacts from the mono-propellant jets is not formed on a central endpiece, but instead is formed by a projecting portion 120 of the end wall 191 of the wall 190 defining the combustion chamber 109.

The mono-propellant jets coming from the injection section 103 and speeded up in a speed-up channel 104 are not projected in converging manner as in the embodiment of FIGS. 1 and 2, but in diverging manner so as to strike the peripheral wall 121 where they are atomized.

As in the first embodiment, a bell-shaped body 101 has a base supported on the end wall 191 and fastened thereto by fastener means 192.

The body 101 has a central tubular portion 111 that serves firstly to hold a central tubular part defining a central channel 106 for feeding a mono-propellant, and secondly serves as a sealing surface for a gasket 151 mounted on the movable part 105 having its terminal portion co-operating with a stationary centering part 130 to define the annular speed-up channel 104 and the annular outlet section 103 for the liquid mono-propellant. The gasket 151 also acts as a damper to avoid oscillation.

The central tubular part defining the central channel 106 for feeding the mono-propellant may be fastened to the body 101 by a nut 112.

The movable part 105 is guided by the inside surface 113 of the bell and presents a pilot section 171 that is subjected to the variations in the flow rate of the mono-propellant in the annular portion 107 of the feed channel 106.

A spring 108 is interposed between the movable part 105 and a top portion of the body 101 to keep the outlet section 103 shut when the propellant flow rate is zero, and to cause said section to open when a predetermined force is exerted by the flow rate of the mono-propellant on the pilot surface 171.

The stationary centering part 130 has a stationary frustoconical peripheral wall 195 situated facing a frustoconical terminal wall 194 of the movable part 105 to define the speed-up channel 104. The large bases of the frustoconical portions face towards the stationary wall 121 such that the propellant jets diverge.

After being injected through the outlet section 103 and atomized by impacting against the stationary wall 121, projections of propellant may be present on the front peripheral wall 131 of the stationary centering part 130.

The atomized droplets initially formed by the propellant impacting against the stationary peripheral frustoconical wall 121 are redirected towards the center on being reflected by the front peripheral wall 131.

As in the first embodiment, injecting the mono-propellant at a flow rate that is modulatable and with a speed of injection that is stable gives rise to the propellant being atomized by impacting against a stationary wall while using a mechanical system that is simple and compact.

The bell-shaped body 101 with a column 111 in the center may be machined in a single stage. Given the statically-indeterminate nature of the system, proceeding in this manner makes it possible to guarantee good concentricity so as to ensure simultaneously long guidance for the movable part 105 via the outside surface thereof, sealing with the gasket 151 relative to the inside surface of the movable part 105, and short centering with a plane bearing surface for the body 101 against the end plate 191 of the chamber so as to ensure that the impact surface 121 is properly centered.

The facts of minimizing the number of parts that are stacked one on another, and of machining long cylinders in a single stage serves to guarantee regularity for the injected sheet and for contact between surfaces on closure.

As in the first embodiment, the tip of the movable part 105 constitutes a fine point to minimize the effects of pressure in the chamber 109 on the spring 108 or on spring washers that could be used instead of the spring 108.

FIG. 4 shows a variant embodiment in which a ring 170 is placed on the spring 108 and is kept pressed against the spring 108 by screws 173 (e.g. six screws disposed at 60° intervals from one another). This enables the tension of the spring 108 to be adjusted by being moved in translation via the ring 170. This tension determines the condition for opening the injector. Tests and adjustments may be performed using water, for example.

Optionally, a movement sensor 172 for sensing movement in translation acts on the rear portion of the movable part 105 that is subjected to the action of the spring 108, thereby making it possible by simple geometrical calculation to determine the flow section in the speed-up channel 104. This provides a regulated system that controls injection speed as well as possible.

Figure 2:
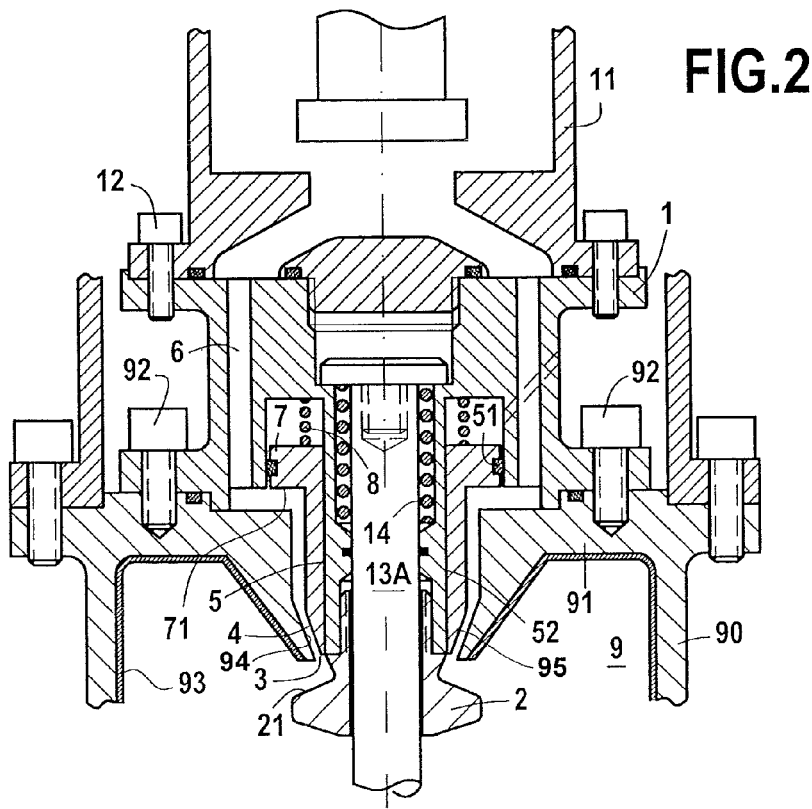
FIG. 2 is a diagrammatic axial section view of a variant embodiment of the FIG. 1 injector device, which device is combined with a device for controlling shutting of the throat of the combustion chamber.

The adjustment and regulation elements 170, 171, and 172 may also be implemented with the first embodiment of FIGS. 1 and 2 so as to act on the spring 8 and the movable part 5.

Under certain conditions of fluid state and injection, the projecting portion 20; 120 with the surface 21; 121 may be omitted for operation taking place with atomization in a free sheet.

Figure 3:
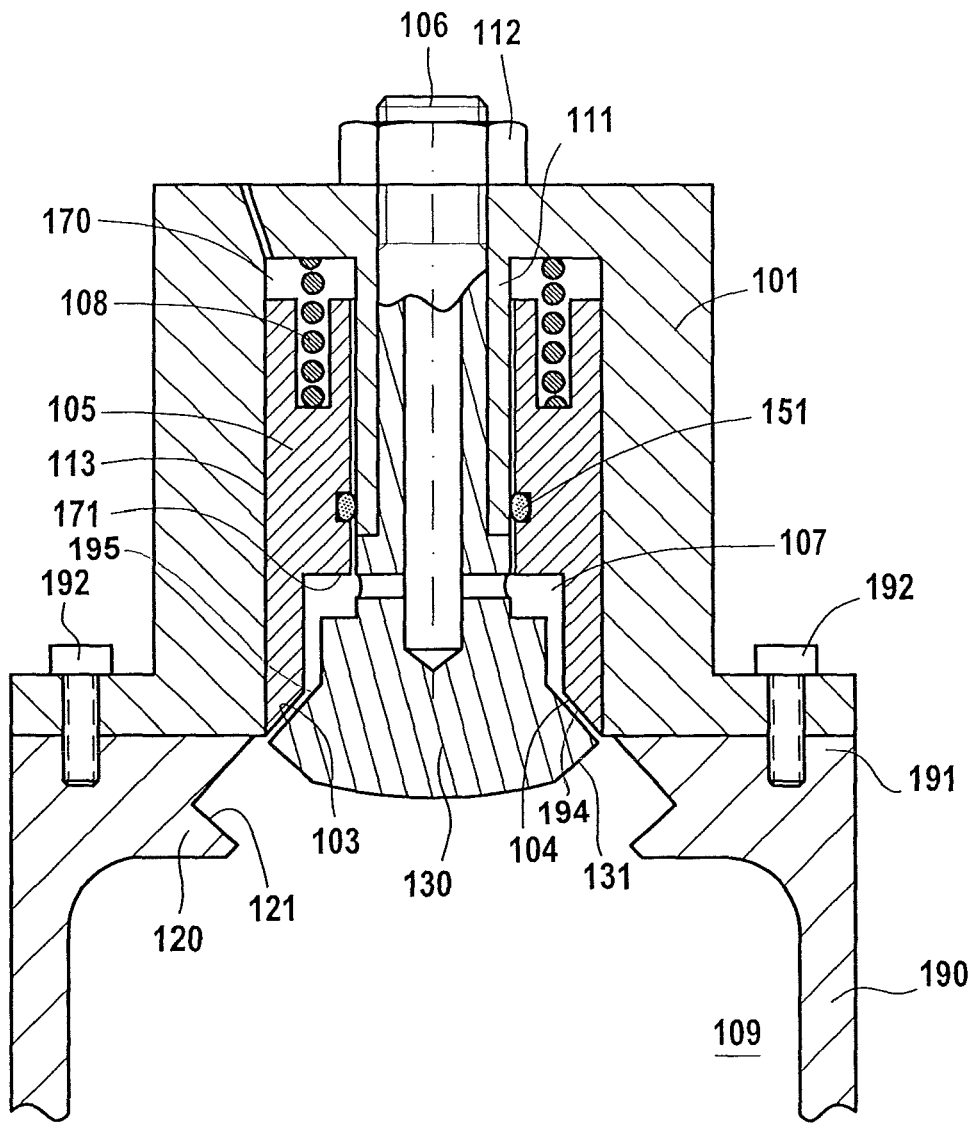
FIG. 3 is a diagrammatic axial section view of a mono-propellant injector device in a second embodiment of the invention, with a stationary peripheral wall for receiving the impact of the jet of propellant.
Figure 4:
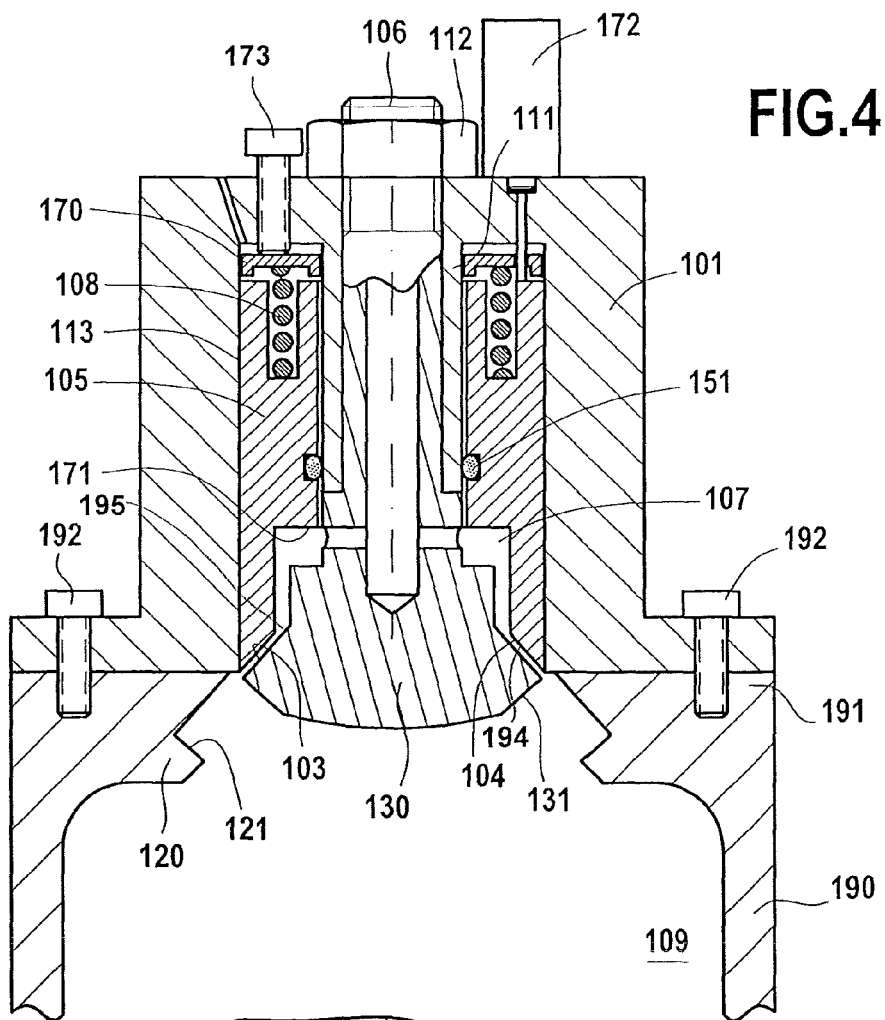
FIG. 4 is a diagrammatic axial section view of a variant embodiment of the FIG. 3 injector device, with a device for adjusting the tension of a spring in translation and a sensor for sensing the movement in translation of the movable part that modulates the propellant flow rate.
Figure 5:
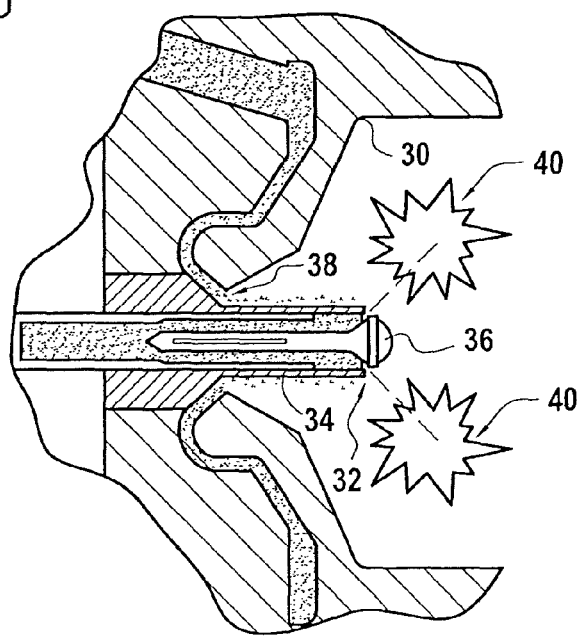
FIG. 5 is a diagrammatic axial section view of a prior art device for bi-propellant injection that is provided with a movable part for modulating the rate at which one propellant is injected.
Figure 6:
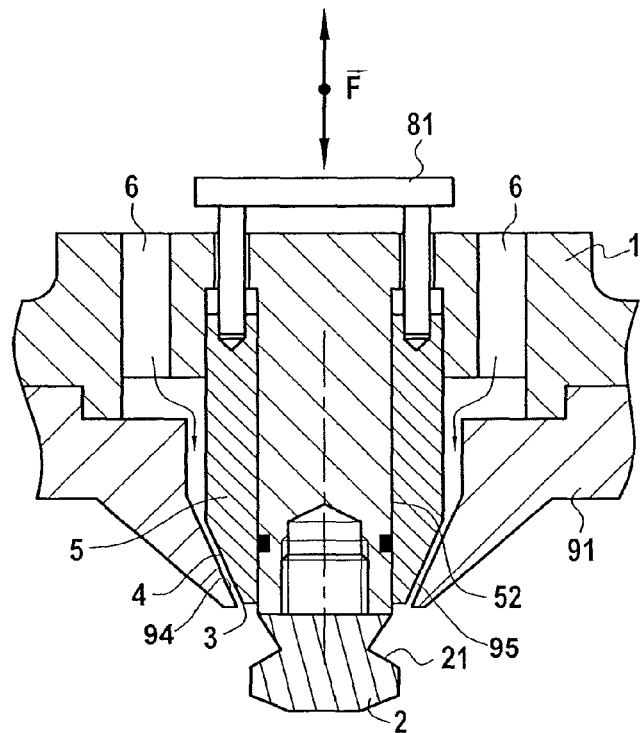
FIG. 6 is a diagrammatic axial section view of a variant embodiment of the FIG. 1 injector device.
Figure 7:
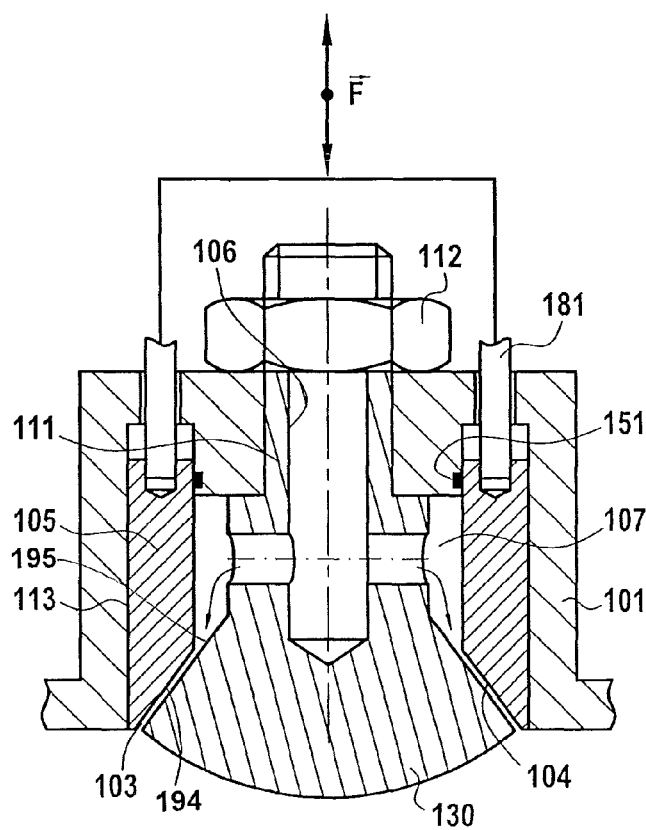
FIG. 7 is a diagrammatic axial section view of a variant embodiment of the FIG. 3 injector device.

Furthermore, and optionally, the pilot section 71; 171 and the spring 8; 108 can be omitted. In these variations of the embodiments of FIGS. 1 and 3, as shown in FIGS. 6 and 7 respectively, the movable part 5; 105 is coupled to an actuator 81; 181 that may, by way of example, be of the mechanical, hydraulic, or electrical type so as to be controlled in terms of force. In the drawings, there can be seen essentially the actuator control rods that are engaged in orifices formed in the body 1; 101.

In the variant of FIG. 7, the nut 112 may be omitted and the parts 101 and 130 may be secured to each other by welding, thereby releasing space to receive the actuator 181. Under such circumstances, propellant feed may take place not via a central channel 106 but via a torus feeding all of the bores formed in the part 101, as in the variant embodiment of FIG. 6.

In the present description, and in conventional manner, a member is said to be for "short centering" when it defines a zone of contact that can be modelled as a sphere-cylinder contact.

If the length of the contact zone is L and if the diameter of the short centering member is D, then a relationship of the following type applies:

$$L \leq 0.8D$$

Preferably, it is possible to choose the value for the length L of the contact zone to lie within the following range of values:

$$0.1D \leq L \leq 0.5D$$

In more preferred manner, it is possible to select the value for the length L of the contact zone to lie in the following range of values:

$$0.1D \leq L \leq 0.3D$$

Furthermore, likewise in conventional manner, a member is said to be for "long centering" when it defines a contact zone that can be modelled as a pivoting-sliding contact.

If the length of the contact zone is L and if the diameter for the member for long centering is D, then a relationship of the following type applies:

$$D \leq L$$

Preferably, a value may be selected for the length L of the contact zone that lies in the following range of values:

$$1.5D \leq L$$

What is claimed is:

1. A device for injecting a liquid mono-propellant with a large amount of flow rate modulation, the device being disposed at the upstream end of a wall of a combustion chamber of a rocket engine and including a channel for feeding it with a mono-propellant from a tank,
   wherein the device has a single annular speed-up channel connected to the feed channel and having its outlet opening out via an annular injection section, the speed-up channel and the annular injection section being defined firstly by a first wall forming a stationary surface of revolution situated level with said upstream end, and secondly by a second wall forming a surface of revolution on a part that is movable in translation relative to said first wall forming a stationary surface of revolution and presenting beside the combustion chamber a free end that constitutes a fine edge, and
   wherein the movable part has a pilot section that is subjected to the effects of the fluid flow rate in the feed channel and that acts against the action of a resilient mechanical element dimensioned to enable the movable part to move into an open position when a predetermined force is exerted on the pilot section.

2. A device according to claim 1, having a third wall forming a stationary surface of revolution situated facing the annular injection section to receive a jet of the liquid mono-propellant projected through the annular injection section.

3. A device according to claim 2, wherein the third wall constituting a stationary surface of revolution is formed on a central endpiece connected to the upstream end of the wall of the combustion chamber.

4. A device according to claim 2, wherein the third wall constituting a stationary surface of revolution is formed on a peripheral ring connected to the upstream end of the wall of the combustion chamber.

5. A device according to claim 1, wherein the resilient element is constituted by a calibrated spring or by a set of spring washers.

6. A device according to claim 1, wherein the first wall constituting a stationary surface of revolution and the second wall constituting a surface of revolution on the movable part are frustoconical with their small bases facing towards the third wall constituting a stationary surface of revolution, which third wall is formed on a central endpiece connected to the upstream end of the wall of the combustion chamber.

7. A device according to claim 1, wherein the first wall constituting a stationary surface of revolution and the second wall forming a surface of revolution on the movable part are frustoconical with their large bases facing towards the third wall constituting a stationary surface of revolution, which third wall is formed on a peripheral ring connected to the upstream end of the wall of the combustion chamber.

8. A device according to claim 2, wherein the third wall constituting a stationary surface of revolution is frustoconical.

9. A device according to claim 1, wherein the mono-propellant feed holes are defined by a bell-shaped body having: a bearing flange fastened by bolts to the upstream end of the combustion chamber wall; and a guide surface for the movable part; and also a sealing surface against which a gasket slides.

10. A device according to claim 9, including a central part secured to a central column that defines the first wall constituting a stationary surface of revolution and that further includes a front wall with a portion situated facing the third wall constituting a stationary surface of revolution, which portion forms a reflector for the jet of liquid mono-propellant projected against the third wall constituting a stationary surface of revolution, which third wall is formed on a peripheral ring connected to the upstream end of the wall of the combustion chamber.

11. A device according to claim 1, wherein the resilient element is constituted by a spring against which a bearing ring bears, having a position that is adjusted by screws for adjusting in translation the tension of the spring that determines the opening condition for the injector.

12. A device according to claim 1, further comprising a sensor for sensing movement in translation of the movable part that serves to determine by simple geometrical calculation the flow section through the speed-up channel.

13. A device according to claim 1, wherein the part that is movable in translation is coupled to an actuator.

14. A device according to claim 10, wherein the external diameter of the movable part is substantially equal to the maximum external diameter of said stationary central part at the level of said fine edge.

\* \* \* \* \*